United States Patent
Bowers

(10) Patent No.: US 6,401,555 B1
(45) Date of Patent: Jun. 11, 2002

(54) TUBE PACKING EXTENSION ASSEMBLY FOR USE IN HIGH TEMPERATURE GAS FLOW SENSING ELEMENTS AND THE LIKE

(76) Inventor: James R. Bowers, 1453 Mars Ave., Lakewood, OH (US) 44107

(*) Notice: Subject to any disclaimer, the term of this patent is extended or adjusted under 35 U.S.C. 154(b) by 0 days.

(21) Appl. No.: 09/333,070

(22) Filed: Jun. 14, 1999

(51) Int. Cl.⁷ .......................... G01D 21/00; F16L 11/00
(52) U.S. Cl. ...................... 73/866.5; 138/110
(58) Field of Search .................. 73/861.67, 273, 73/272 R, 431, 866.5; 138/96 R, 961, 110; 220/796; 215/316, 317

(56) References Cited

U.S. PATENT DOCUMENTS

| | | | | |
|---|---|---|---|---|
| 4,154,100 A | * | 5/1979 | Harbaugh et al. | ....... 73/861.66 |
| 4,370,919 A | * | 2/1983 | Wagner et al. | ............ 138/96 R |
| 4,696,194 A | * | 9/1987 | Taylor | ..................... 73/861.66 |
| 4,697,465 A | * | 10/1987 | Evans et al. | ............... 73/866.5 |
| 4,717,159 A | * | 1/1988 | Alston et al. | ............ 73/861.65 |
| 5,736,651 A | | 4/1998 | Bowers | ..................... 73/861.66 |
| 6,047,739 A | * | 4/2000 | Nixon | ....................... 138/96 R |

* cited by examiner

*Primary Examiner*—Harshad Patel
(74) *Attorney, Agent, or Firm*—John D. Gugliotta

(57) ABSTRACT

A tube packing extension assembly is provided, wherein a conventional cap fitting with plug fitting is replaced with a tube packing extension enclosure that incorporates an extended, linearly elongated outer tube sheath for circumscribing in a concentric manner any tube end that extends outward from the outer conduit sidewall. This outer tube sheath is formed as attached to a tube fitting connection nut, and provides an extension, of selectable size, that extends outward from the conduit sidewall, yet fully encloses and protects the end of the sensing tube. A tube packing extension cap can thereby be removably affixed to the outer end of the tube packing extension enclosure outward by a sufficient length should any brushing or purging of the tubes be required.

6 Claims, 3 Drawing Sheets

TUBE PACKING EXTENSION ASSEMBLY FOR USE IN HIGH TEMPERATURE GAS FLOW SENSING ELEMENTS AND THE LIKE

RELATED APPLICATIONS

There have been no previously filed related applications, nor any copending applications anywhere in the world.

FIELD OF THE INVENTION

This invention relates to insertion type fluid flow sensing elements for measuring air or gas flowrates, and more specifically to an improved tube packing extension assembly for use therewith. It is particularly useful in providing flow element tube access ports for use in conjunction with flow measuring devices in air and gas flow applications in large ducts or pipes, and at high temperatures.

BACKGROUND OF THE INVENTION

The instrumentation and process control industry has recognized the use of the Pitot tube as a reliable device for measuring the volumetric flow of both liquids and gasses for many years. The Pitot tube operates based upon the principal that when a fixed probe is inserted into piping or duct work containing a moving fluid, the total pressure sensed by the probe is the sum of the static pressure exerted by the fluid, whether in motion or at rest, and the dynamic pressure equivalent to the kinetic energy of the fluid in motion. Conventional Pitot tube arrangements provide measurement of both the static and total pressure of the flowing fluid, the difference between which is the dynamic pressure. This differential pressure, i.e. the dynamic pressure, is directly related to and can be used to calculate the linear flow rate within the piping or duct work. The volumetric flow rate of the fluid is determined by multiplying the linear flow rate by the cross-sectional area of the conduit.

The Pitot tube is particularly useful in measuring gas flows in piping or duct work with a large cross-sectional area because they cause negligible pressure loss within the conduit. For use in conjunction with such traversing Pitot tubes, exterior instrument taps, connected to averaging headers, sensing heads, or the like, are provided for connection of each sensing tube to a differential pressure instrument for indicating flow rate and/or transmitting a flow rate signal. Such instrument taps typically penetrate the duct housing and are affixed to the housing utilizing a ferrule encircling the tube and compressed against a fitting by a nut. Similarly, the opposite end of the sensing tube can be affixed at a manifold or opposing duct housing penetration utilizing compression tube fittings. Such manner of generally affixing tubes penetrating a shell or connecting to other fittings is rather well known throughout the chemical process industries, but can result in material stress and fatigue related leakage or failure if various materials, such as differing grades of steel or stainless steel are utilized, causing differing expansion rates result upon heating or cooling. This is due to the fact that the use of conventional ferrules "lock" onto the tubing, thereby preventing the movement necessarily resulting from thermal differential expansion However, one particular improvement, disclosed in U.S. Pat. No. 5,736,651, issued in the name of Bowers, incorporated herein by reference in its entirety, provides a particular improvement wherein a high-temperature tubing connection for a shell penetration incorporates a high temperature packing that replaces the conventional ferrule. A ribbon packing or packing ring made of any pliable material resistant to high temperatures can be utilized for this packing. Particularly disclosed is the use of a GRAPHOIL (™) packing material, as manufactured by U-CAR (™), or similar and equivalent material as being successful in permanently "sealing" the tube between the nut and the fitting, thereby assuring a high pressure seal such that the housing retains its integrity and remains leak-free even under conditions of extreme temperature or extreme temperature gradient cycling. Such a high temperature packing remains pliable to seal around the tubes, while still permitting lateral motion of the traverse tubes which is encountered when thermal differential expansion occurs. Such an improvement needs to be utilized at least at one end of the sensing tube in order to prevent the stress damaged mentioned above.

While many solutions to the problems associated with high temperature flow measurement are incorporated into the Bowers' invention of U.S. Pat. No. 5,736,651, that disclosure does not address or anticipate the specific problems solved by the present invention. As such, the present invention is sufficiently novel and non-obvious so as to distinguish it from the prior art, including the present inventor's own prior art. As the commercial success of such high temperature tube packings result in a greater number of industrial applications, other opportunities for improvement in Pitot tube connections have become apparent for use generally within the utility and industrial markets that otherwise have been unapparent. The present invention is one such improvement.

As a result of a general need for providing tube clean out ports in such high temperature Pitot tube applications, the present invention provides a tube packing extension assembly for use in such applications.

BRIEF SUMMARY OF THE INVENTION

According to the preferred embodiment of the present invention, a tube packing extension assembly for use in high temperature gas flow sensing elements and the like is provided. A sensing tube penetrating a duct or conduit housing incorporates a high temperature packing that replaces a traditional ferrule. The high temperature packing is formed of a ribbon packing or packing ring made of any pliable material resistant to high temperatures. However, in its preferred embodiment, a GRAPHOIL (™) packing material, as manufactured by U-CAR (™), or similar and equivalent material has been found to be successful in permanently "sealing" the tube between the nut and the fitting, thereby assuring a high pressure seal such that the housing retains its integrity and remains leak-free even under conditions of extreme temperature or extreme temperature gradient cycling. Such a high temperature packing remains pliable to seal around the sensing tubes, while still permitting lateral motion of traverse tubes which is encountered when thermal differential expansion occurs. Traditionally furnished with such a tube termination is a tube access port assembly having an annular cap fitting terminating the end of the tube and housing a plug fitting for plugging the port thereby created. Such access ports are useful for inspection or cleaning of the array tube interiors should debris accumulate in heavy particulate-laden applications.

In the present invention, the cap fitting with plug fitting is replaced with a tube packing extension enclosure that incorporates an extended, linearly elongated outer tube sheath for circumscribing in a concentric manner any tube end that extends outward from the outer conduit sidewall. This outer tube sheath is formed as attached to a tube fitting connection nut, and provides an extension, of selectable size, that extends outward from the conduit sidewall, yet fully encloses and protects the end of the sensing tube. A tube packing extension cap can thereby be removably affixed to the outer end of the tube packing extension enclosure outward by a sufficient length should any brushing or purging of the tubes be required.

DETAILED DESCRIPTION OF THE PREFERRED EMBODIMENT

Figure 1:
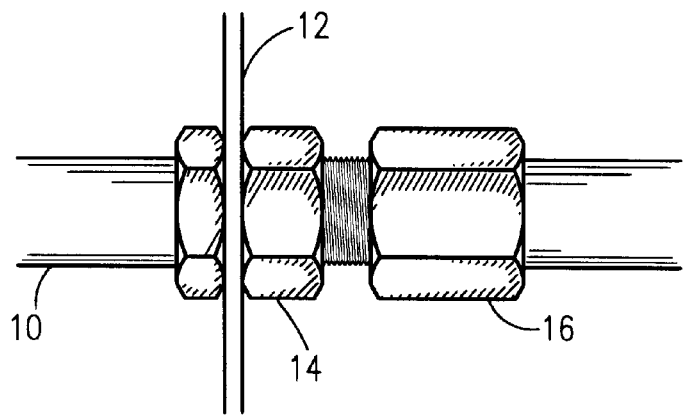
FIG. 1 is a partial plan view of a typical tube shell penetration as provided in the Prior Art.

As shown in FIG. 1, a typical tube shell penetration is disclosed according to the prior art. In a generally conventional manner, the total pressure sensing tube or static pressure sensing tube, herein referenced as 10, is affixed to the housing or conduit wall 12 utilizing a ferrule (not shown) encircling the tube 10 and compressed against a fitting 14 by a nut 16. Similarly, the opposite end of the sensing tube can be affixed at a sensing head, manifold, or opposite sidewall utilizing similar compression tube fittings. Such manner of generally affixing tubes penetrating a shell or connecting to other fittings is rather well known throughout industry. However, in the currently envisioned application, such a method can result in additional problems, especially at high temperatures. With total pressure tubes and static pressure sensing tubes affixed at both ends, the tubes are, in essence, "locked" in place. If various materials, such as differing grades of steel or stainless steel are utilized, differing expansion rates result upon heating or cooling. Such a condition can result in material stress and fatigue related leakage or failure, especially catastrophic seal failure, upon such high gradient temperature cycling. Also, the use of conventional ferrules "lock" onto the tubing, thereby preventing the movement necessarily resulting from thermal differential expansion. Therefor, a prior particular improvement is embodied as shown in FIG. 2, wherein a high-temperature tubing connection for a shell penetration, generally noted as 20, is shown.

Figure 2:
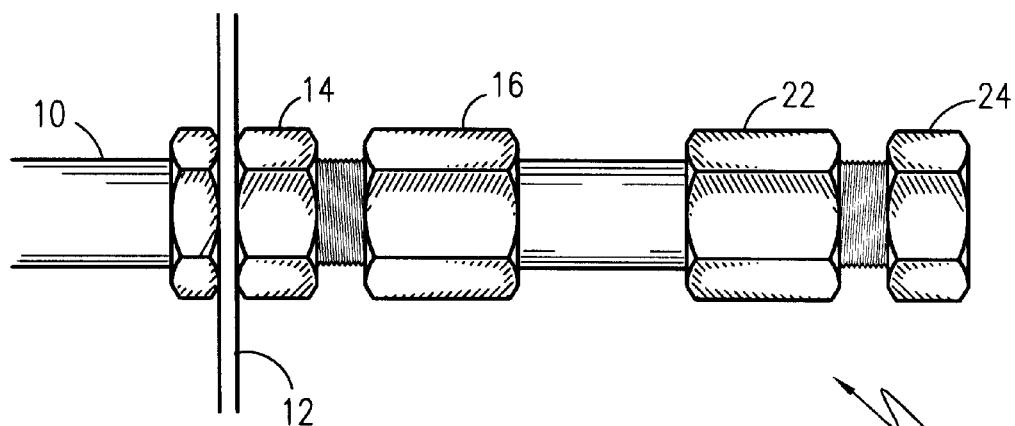
FIG. 2 is a partial plan view of a typical tube shell penetration for a traverse tube termination as anticipated in the PriorArt, and particularly as anticipated in U.S. Pat. No. 5,736,651, issued in the name of Bowers, and incorporated fully herein by reference.

As is shown in FIG. 2, a high temperature packing replaces the ferrule. It is envisioned that a ribbon packing or packing ring made of any pliable material resistant to high temperatures can be utilized for this packing. However, in its preferred embodiment, a GRAPHOIL (™) packing material, as manufactured by U-CAR (™), or similar and equivalent material has been found to be successful in permanently "sealing" the tube between the nut 16 and the fitting 14, thereby assuring a high pressure seal such that the conduit sidewall 12 retains its integrity and remains leak-free even under conditions of extreme temperature or extreme temperature gradient cycling. Such a high temperature packing remains pliable to seal around the tubes, while still permitting lateral motion of the traverse tubes which is encountered when thermal differential expansion occurs. It is envisioned that such an improvement needs to be utilized on at least one end of the sensing tube in order to prevent the stress damage mentioned above.

As further shown in FIG. 2, a sensing tube access port is shown in greater detail, having an annular cap fitting 22 terminating the end of the tube 10 and housing a plug fitting 24 for plugging the port thereby created. Such access ports are useful for inspection or cleaning of the sensing tube interiors should debris accumulate in heavy particulate-laden applications. The cap fitting 22 with plug fitting 24 extends outward from the sidewall 12 by a sufficient length should any brushing or purging of the tubes be required.

Figure 3:
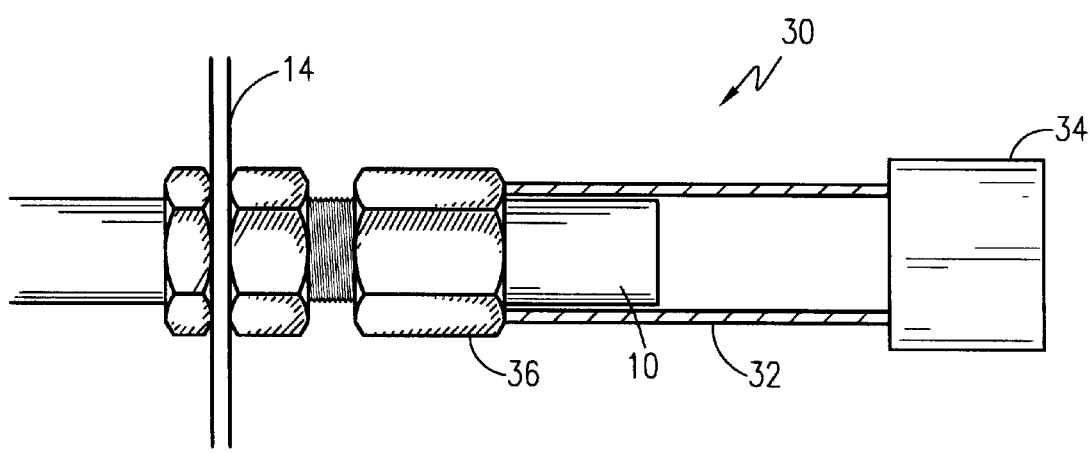
FIG. 3 is partial plan view of a tube packing extension assembly for use in high temperature gas flow sensing elements and the like according to the preferred embodiment of the present invention.
Figure 4:
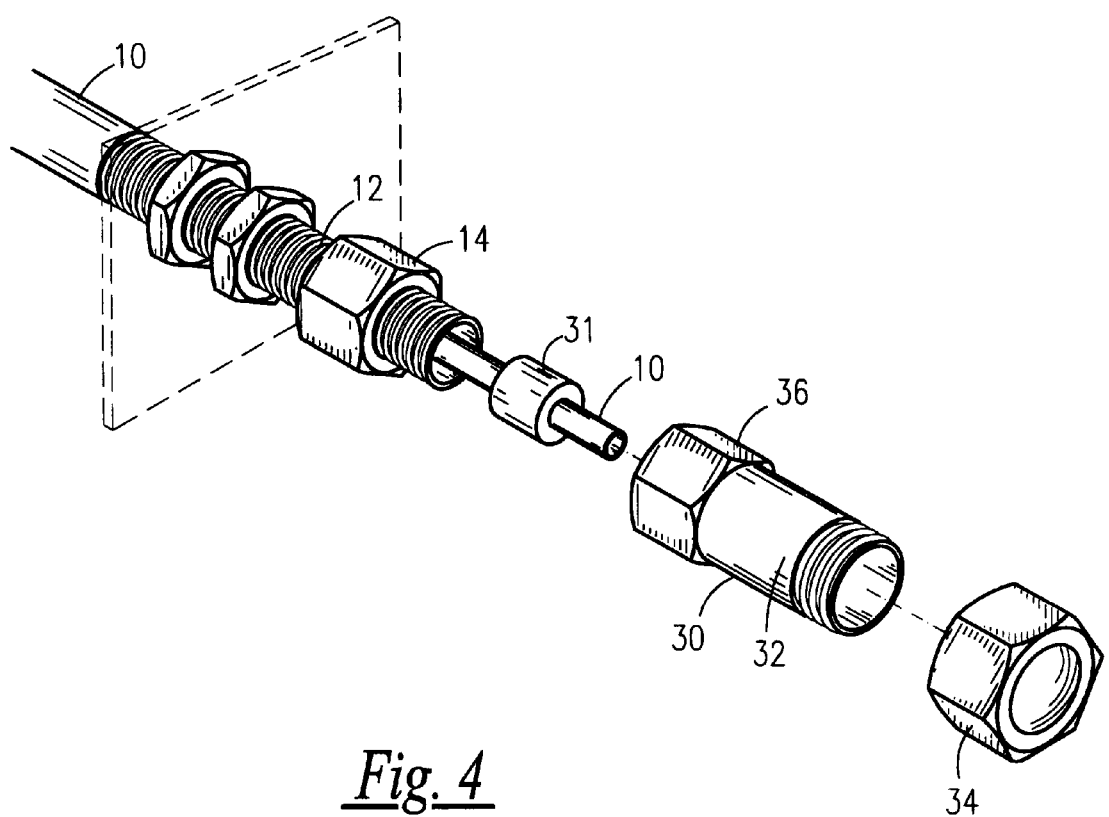
FIG. 4 is an exploded perspective view thereof.

In the present invention as shown in FIG. 3 and FIG. 4, the cap fitting with plug fitting is replaced with a tube packing extension enclosure 30 that incorporates an extended, linearly elongated outer tube sheath 32 for circumscribing in a concentric manner any tube end 10 that extends outward from the outer conduit sidewall 14. This outer tube sheath 32 is formed as attached to a tube fitting connection nut 36, and provides an extension, of selectable size, that extends outward from the conduit sidewall 14, yet fully encloses and protects the end of the sensing tube 10. A tube packing extension cap 34 can thereby be removably affixed to the outer end of the tube packing extension enclosure 30 outward by a sufficient length should any brushing or purging of the tubes be required.

Further, for purposes of disclosing the presently known best mode of the invention, and not intended to limit the scope or anticipation of any particular embodiment, it is known that by forming the outer tube sheath 32 from standard stock material, namely commercially available iron pipe, tubes, and the like, a conventionally available and commercially economical cap 34 can also be utilized. This can be accomplished by welding such a tube or pipe directly to one end of a conventional tube fitting, thereby provide such a tube packing extension assembly that is economically efficient, easy to manufacture, and familiar in size and shape such as to allow operators or maintenance individuals to perform installation or maintenance with conventional, existing tools and methods. Further, standard pipe threads and fittings can be utilized to connect such a clean-out port to other piping for purposes of blowing out, pigging, or the like with conventionally available equipment.

While the preferred embodiments of the invention have been shown, illustrated, and described, it will be apparent to those skilled in this field that various modifications may be made in these embodiments without departing from the spirit of the present invention, For that reason, the scope of the invention is set forth in the following claims.

What is claimed is:

1. A tube packing extension assembly for use in gas flow sensing elements of the type utilizing flow sensing tubes, said tube packing extension assembly comprising:

a tube packing extension enclosure that incorporates a separate, extended, linearly elongated outer tube sheath for circumscribing in a concentric manner a tube end that extends outward from an outer conduit sidewall;

said outer tube sheath formed as attached to a tube fitting connection nut and provides an extension that extends outward from the conduit sidewall; and a tube packing extension cap removably affixed to the outer end of the tube packing extension enclosure outward by a sufficient length to provide access to the flow sensing tubes.

2. The tube packing extension assembly of claim 1, wherein said outer tube sheath is formed from standard metal stock material.

3. A high temperature tube packing extension assembly for use in gas flow sensing elements of the type utilizing flow sensing tubes, said tube packing extension assembly comprising:

an exterior element access port penetrating a flow conduit and in communication with a sensing element;

a high-temperature tubing connection for affixing a sensing element to a conduit sidewall, said high temperature tubing connection comprising a compression fitting seated around a ribbon packing or packing ring made of any pliable material resistant to high temperatures;

a tube packing extension enclosure that incorporates an extended, linearly elongated outer tube sheath for circumscribing in a concentric manner to a tube end that extends outward from an outer surface of said conduit sidewall;

said outer tube sheath formed as attached to said high-temperature tubing connection and provides an extension, of selectable size, that extends outward from the conduit sidewall;

a tube packing extension cap removably affixed to the outer end of the tube packing extension enclosure outward by a sufficient length to provide access to the flow sensing tubes.

4. The high temperature gas flow sensing element as described in claim 3, wherein said ribbon packing or packing ring is comprised of GRAPHOIL (™) packing material, as manufactured by U-CAR (™), or similar and equivalent material.

5. In a tube packing extension assembly for use in gas flow sensing elements of the type utilizing flow sensing tubes and having a shell penetration affixed to a housing or conduit side wall utilizing a packing encircling the tube and compressed against a fitting by a connection nut, wherein the improvements comprise:

said packing being a high temperature packing;

a tube packing extension enclosure that incorporates an extended, linearly elongated outer tube sheath for circumscribing in a concentric manner a tube end that extends outward from an outer conduit sidewall;

said outer tube sheath formed as attached to said connection nut, thereby providing an extension, of selectable size, that extends outward from the conduit sidewall; and a tube packing extension cap removably affixed to the outer end of the tube packing extension enclosure outward by a sufficient length to provide access to said flow sensing tubes.

6. In the packing extension assembly of claim 5, wherein the improvement further comprises a ribbon packing made of any pliable material resistant to high temperatures.

* * * * *